US011885879B2

(12) United States Patent
Suzuki et al.

(10) Patent No.: US 11,885,879 B2
(45) Date of Patent: Jan. 30, 2024

(54) MEASUREMENT APPARATUS AND MEASUREMENT METHOD

(71) Applicant: Mitutoyo Corporation, Kanagawa (JP)

(72) Inventors: Yoshimasa Suzuki, Ibaraki (JP); Shinichi Hara, Ibaraki (JP); Hiroki Ujihara, Ibaraki (JP)

(73) Assignee: Mitutoyo Corporation, Kanagawa (JP)

( * ) Notice: Subject to any disclaimer, the term of this patent is extended or adjusted under 35 U.S.C. 154(b) by 455 days.

(21) Appl. No.: 16/997,823

(22) Filed: Aug. 19, 2020

(65) Prior Publication Data

US 2021/0063573 A1  Mar. 4, 2021

(30) Foreign Application Priority Data

Aug. 26, 2019  (JP) ................................. 2019-153780

(51) Int. Cl.
*G01C 3/08* (2006.01)
*G01S 17/34* (2020.01)
*G01S 7/4913* (2020.01)
*G01S 7/4912* (2020.01)

(52) U.S. Cl.
CPC ............ *G01S 17/34* (2020.01); *G01S 7/4913* (2013.01); *G01S 7/4917* (2013.01)

(58) Field of Classification Search
None
See application file for complete search history.

(56) References Cited

U.S. PATENT DOCUMENTS

| 11,635,518 B2 * | 4/2023 | Ujihara | G01S 7/4814 356/486 |
| 2002/0071109 A1 * | 6/2002 | Allen | G01S 17/34 356/5.01 |
| 2020/0064477 A1 * | 2/2020 | Komatsuzaki | G01S 7/4811 |

FOREIGN PATENT DOCUMENTS

| JP | 3583906 | | 8/2004 | |
| JP | 2020034546 A | * | 3/2020 | ............ G01S 17/32 |
| JP | 2020197451 A | * | 12/2020 | ............ H01S 3/083 |

OTHER PUBLICATIONS

Takefumi Hara: "Distance Sensing by FSL Laser and Its Application", with English translation of the relevant section of Non-Patent Document; vol. 7, No. 3, 2012; 10 pgs.

* cited by examiner

*Primary Examiner* — Mark Hellner
(74) *Attorney, Agent, or Firm* — Oblon, McClelland, Maier & Neustadt, L.L.P.

(57) ABSTRACT

A measurement apparatus includes a laser apparatus, a branch that branches a frequency-modulated laser beam into a reference light and a measurement light, a beat signal generator that generates a beat signal by mixing the reference light and a reflected light that is the measurement light radiated onto an object to be measured, a first analyzer that analyses a first signal component corresponding to a difference in a propagation distance between the reference light and the measurement light on the basis of the beat signal, a second analyzer that analyses a second signal component corresponding to a cavity frequency of an optical cavity on the basis of the beat signal, and calculation circuitry that calculates the difference in the propagation distance between the reference light and the measurement light.

16 Claims, 12 Drawing Sheets

MEASUREMENT APPARATUS AND MEASUREMENT METHOD

CROSS-REFERENCE TO RELATED APPLICATIONS

The present application claims priority to Japanese Patent Applications number 2019-153780, filed on Aug. 26, 2019. The contents of this application are incorporated herein by reference in their entirety.

BACKGROUND OF THE INVENTION

A frequency-shied feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31).

An optical distance meter using a frequency-shifted feedback laser (FSFL) can acquire a large amount of three-dimensional information in a contactless manner, and has been used, for example, in design and production sites. The FSFL sometimes caused a reduction in measurement accuracy of the optical distance meter, since the cavity length (resonator length) may change due to environmental fluctuations such as temperature. In order to prevent the reduction in the measurement accuracy, conventionally, it has been considered to reduce the environmental fluctuations by installing the FSFL in a temperature chamber, to observe a change in the cavity length by monitoring outputs of the FSFL, and the like. However, such measures cause an increase in the scale of the apparatus and lead to a problem of an increase in cost and the like.

BRIEF SUMMARY OF THE INVENTION

The present disclosure has been presented in view of this problem, and an object of the disclosure is to suppress a reduction of accuracy with a simple configuration even if environmental fluctuations occur in an optical distance meter.

A first aspect provides a measurement apparatus including: a laser apparatus that has an optical cavity (laser resonator) and outputs a frequency-modulated laser beam with a plurality of modes; a branching part that branches a portion of the frequency-modulated laser beam output by the laser apparatus as a reference light and at least some of the remaining portion of the frequency-modulated laser beam as a measurement light; a beat signal generation part that generates a beat signal by mixing the reference light and a reflected light that is reflected by radiating the measurement light onto an object to be measured; a first analyzing part that analyzes a first signal component corresponding to a difference in a propagation distance between the reference light and the measurement light on the basis of the beat signal; a second analyzing part that analyzes a second signal component corresponding to a cavity frequency (resonator frequency) of the optical cavity on the basis of the beat signal; and a calculation part that calculates the difference in the propagation distance between the reference light and the measurement light based on analysis results of the first signal component and the second signal component.

A second aspect provides a measurement method including: outputting a frequency-modulated laser beam with a plurality of modes from a laser apparatus having an optical cavity; branching a portion of the frequency-modulated laser beam as a reference light and at least some of the remaining portion as a measurement light; generating a beat signal by mixing the reference light and a reflected light that is reflected by radiating the measurement light onto an object to be measured; analyzing a first signal component corresponding to a difference in a propagation distance between the reference light and the measurement light on the basis of the beat signal; analyzing a second signal component corresponding to a cavity frequency of the optical cavity on the basis of the beat signal; and calculating the difference in the propagation distance between the reference light and the measurement light based on analysis results of the first signal component and the second signal component.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration Examples of a Measurement Apparatus 100]

Figure 1:
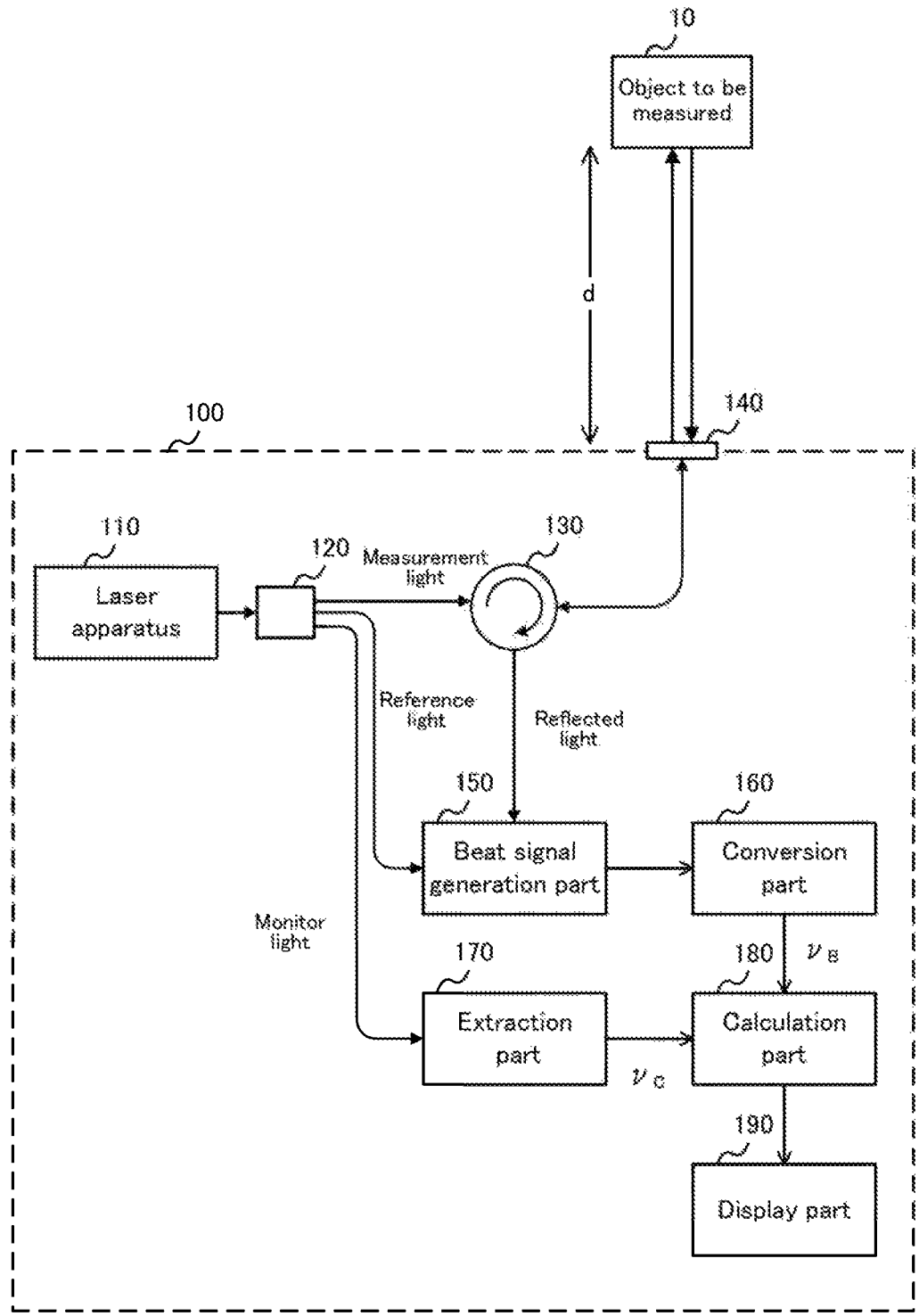
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of the laser beam radiated onto the object to be measured 10. The measurement apparatus 100 includes a laser apparatus 110, a branching part 120, an optical circulator 130, an optical head part 140, a beat signal generation part 150, a conversion part 160, an extraction part 170, a calculation part 180, and a display part 190.

The laser apparatus 110 has an optical cavity (laser resonator) and outputs a frequency-modulated laser beam with a plurality of modes. The laser apparatus 110 is provided with a frequency shifter in a cavity (resonator), and outputs a plurality of longitudinal mode lasers whose oscillation frequencies change linearly with the passage of time. The laser apparatus 110 is, for example, a frequency-shifted feedback laser (FSFL). The FSFL will be described later.

The branching part 120 branches the frequency-modulated laser beam output from the laser apparatus 110, with a portion of it as a reference light and at least some of the remaining portion of it as a measurement light. The branching part 120 branches the frequency-modulated laser beam output from the laser apparatus 110 into the reference light, the measurement light, and a monitor light, for example. The branching part 120 is, for example, a one-in-three-out fiber optic coupler. In the example of FIG. 1, the branching part 120 supplies the measurement light to the optical circulator 130, the reference light to the beat signal generation part 150, and the monitor light to the extraction part 170. FIG. 1 shows an example in which the branching part 120 is the one-in-three-out optical coupler, but the branching part 120 may alternatively be a combination of two one-in-two-out optical couplers.

The optical circulator 130 has a plurality of input/output ports. For example, the optical circulator 130 outputs a light, which is input to one port, to the next port, and outputs a light, which is input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using the collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a focusing lens. In this case, the optical head part 140 focuses the light input from the optical circulator 130 via the optical fibers on the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and that focusing lens may irradiate the object to be measured 10 with the measurement light and receive the reflected light from the object to be measured 10.

The beat signal generation part 150 receives, from the optical circulator 130, the reflected light that is the measurement light radiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electrical signal, and outputs the electrical signal.

Here, since the reflected light travels back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The conversion part 160 detects the frequency of the beat signal by frequency-analyzing the beat signal generated by the beat signal generation part 150. Here, the frequencies of the beat signals are defined as $\nu_B$.

The extraction part 170 extracts a signal component corresponding to the cavity frequency (resonator frequency) of the optical cavity and is superimposed on the frequency-modulated laser beam output from the laser apparatus 110. For example, the extraction part 170 extracts a signal component of the frequency equal to the cavity frequency corresponding to the cavity length (resonator length) of the laser apparatus 110 from among signal components included in the frequency-modulated laser beam on the basis of the monitor light. Here, the cavity frequency is defined as $\nu_C$.

The calculation part 180 calculates a difference of the propagation distance between the reference light and the measurement light based on a detection result of the conversion part 160 and an extraction result of the extraction part 170. For example, the calculation part 180 calculates the distance d from the optical head part 140 to the object to be measured 10 on the basis of the frequency $\nu_B$ of the beat signal and the cavity frequency $\nu_C$.

The display part 190 displays the calculation result of the calculation part 180. The display part 190 may include a display or the like and display the calculation result. Also, the display part 190 may store the calculation result in a storage unit or the like. The display part 190 may supply the calculation result to an external device a network or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter. Next, a more detailed configuration of the measurement apparatus 100 will be described.

[Configuration Example of the Laser Apparatus 110]

Figure 2:
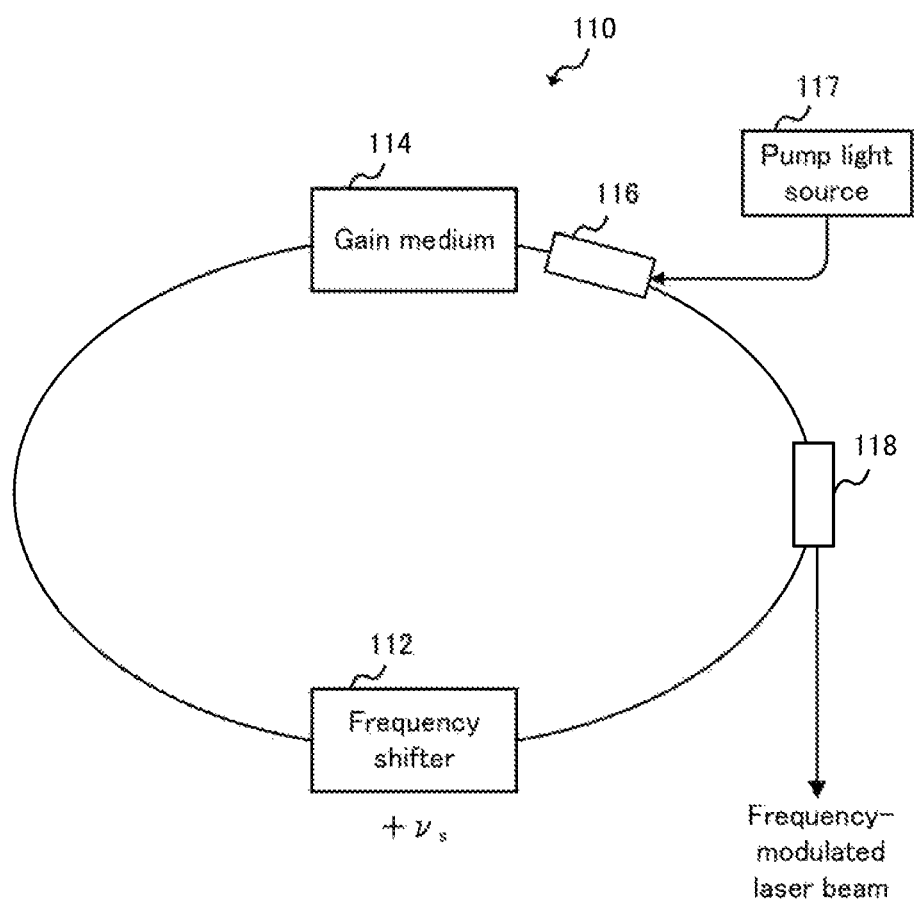
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes an optical cavity and oscillates a laser beam in the optical cavity. The optical cavity of the laser apparatus 110 includes an optical cavity including a frequency shifter 112, a gain medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, an amount of the frequency shift by the frequency shifter 112 is defined as $+v_s$. That is, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the cavity.

That is, the laser apparatus 110 shown in FIG. 2 contains a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity. Frequency characteristics of the laser beam output from the laser apparatus 110 will be described below.

Figure 3:
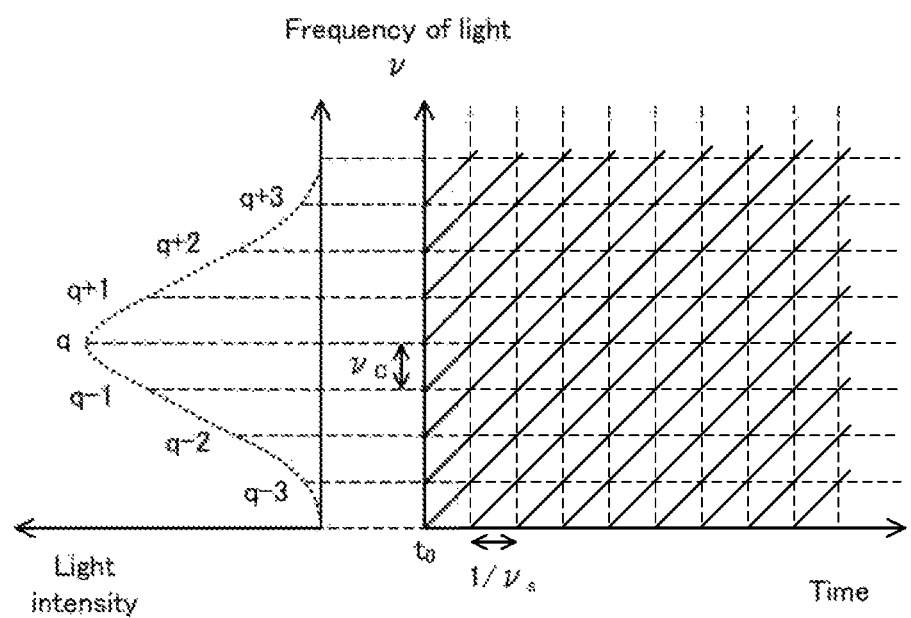
FIG. 3 shows an example of a laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output by the laser apparatus 110 at the time $t_0$. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_C)$ denotes the time for light to go around the cavity, the plurality of longitudinal modes are arranged at intervals of $1/\tau_{RT}(=v_C)$, as represented by the following equation. It should be noted that, $v_0$ is the initial frequency of the light spectrum at the time $t_0$.

$$v_q(t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time $t_0$ on the left side.

In the laser apparatus 110, each time the light in the cavity goes around the cavity, the frequency shifter 112 increases the frequency of the light traveling around the cavity by $v_s$. That is, since the frequency of each of the modes increases by $v_s$ for every passing of $\tau_{RT}$, the rate of change of frequency dv/dt (i.e., chirp rate) becomes approximately equal to $v_s/\tau_{RT}$. Therefore, the plurality of longitudinal modes represented by Equation 1 change as shown in the following equation with the passage of the time t.

$$v_q(t) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is $\Delta t$. That is, when the measurement light is reflected and returned from the object to be measured 10 at the time t, the frequency of the returned reflected light approximately matches the past frequency that is a time $\Delta t$ earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \quad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers (=q-q') and $\Delta t=2d/c$.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT}=v_C$.

$$d = \frac{c}{2v_s v_c}\{v_B(m, d) + mv_c\} \quad \text{[Equation 6]}$$

From Equation 6, it can be understood that the distance d can be calculated from a frequency observation result of the beat signal by determining the interval m of the longitudinal mode numbers. It should be noted that the interval m can be determined by detecting a change in beat signals when the amount of frequency shift vs of the laser apparatus 110 is changed. Since such a method of determining the interval m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
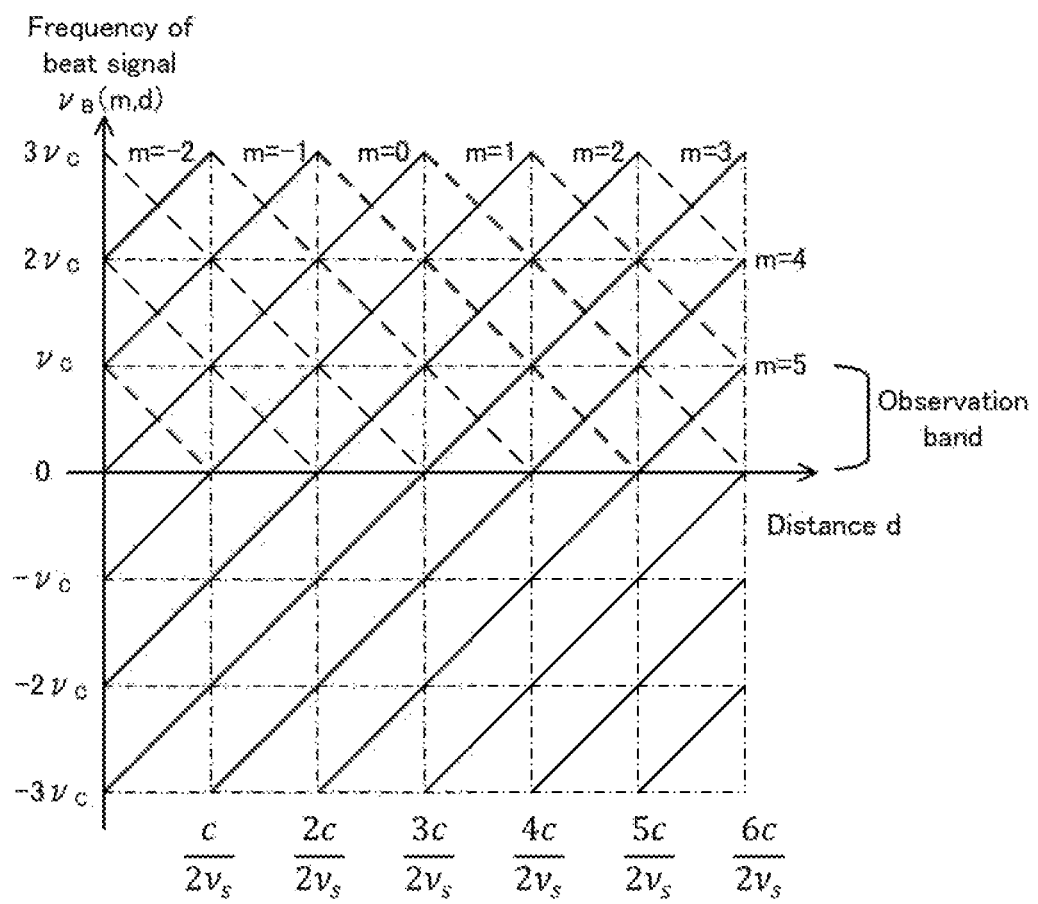
FIG. 4 shows an example of a relationship between (i) a frequency of the beat signal detected by the measurement apparatus 100 according to the present embodiment and (ii) a distance d between an optical head part 140 and the object to be measured 10.

FIG. 4 shows an example of the relationship between the frequency of the beat signal detected by measurement apparatus 100 according to the present embodiment and the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by the solid lines in FIG. 4 are graphs showing the relation of the frequency $v_B(m, d)$ of the beat signal with respect to the distance d for each of the plurality of values of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals vc, a plurality of beat signals having equal values of m are superimposed on the approximately same frequency on the frequency axis. For example, when a frequency band between frequencies 0 and vc is observed, a plurality of beat signals are superimposed on approximately the same frequency and are observed as a single line spectrum.

In addition, the absolute value of the frequency $v_B(m, d)$ of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative of the folded image signals are inverted, the image signals are superimposed on the observed frequency axis at the same frequency as the absolute value of the frequency before being folded. For example, when a frequency band between frequencies 0 and $v_C$ is observed, the beat signal and the image signal are respectively located at different frequencies unless the frequencies of the beat signal and the image signal become $v_C/2$.

As described above, in the observation band between the frequencies 0 and $v_C$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the conversion part 160 using the quadrature detection will be described.

Figure 5:
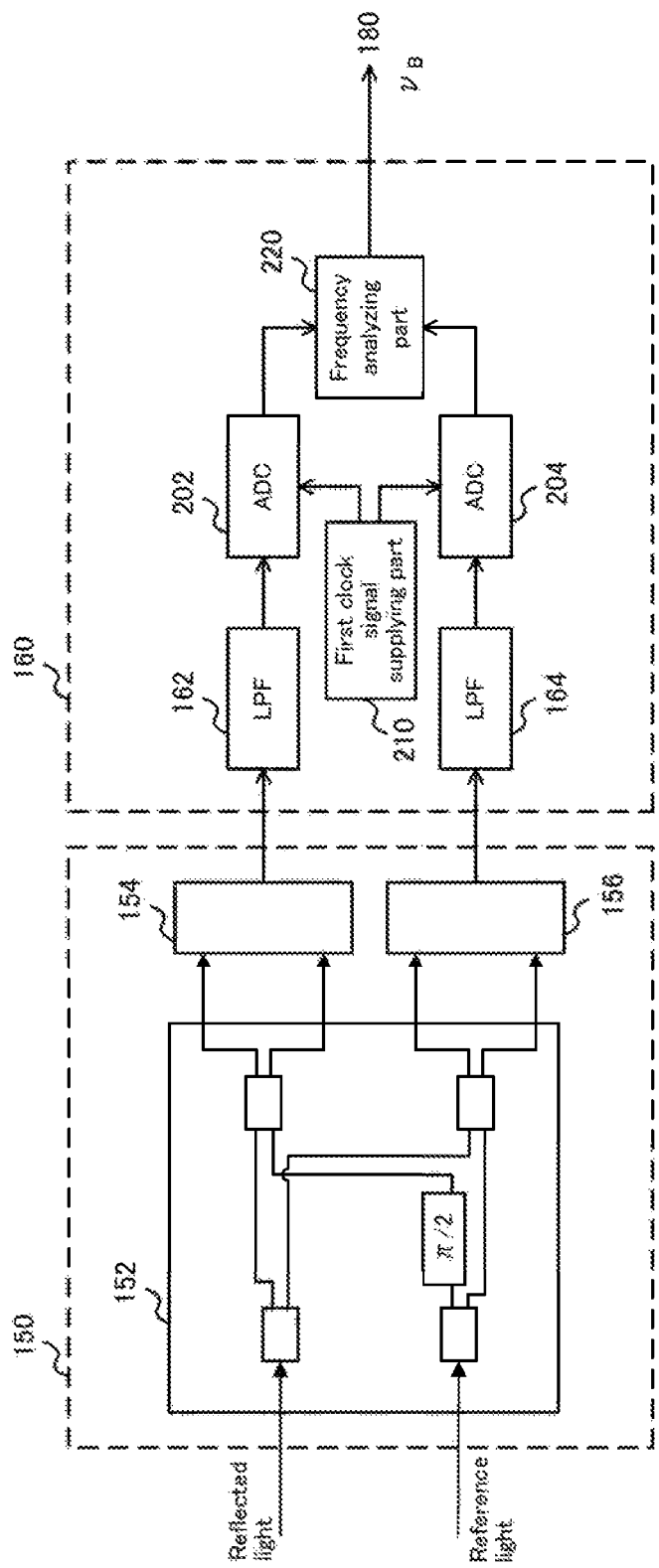
FIG. 5 shows a configuration example of a beat signal generation part 150 and a conversion part 160 according to the present embodiment.

FIG. 5 shows a configuration example of the beat signal generation part 150 and the conversion part 160 according to the present embodiment. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a π/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 156 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the conversion part 160.

The conversion part 160 performs a frequency analysis on the two beat signals. Here, an example in which the conversion part 160 performs the frequency analysis using the first beat signal as an I signal and the second beat signal as a Q signal, will be described. The conversion part 160 includes a first filter part 162, a second filter part 164, a first AD converter 202, a second AD converter 204, a first clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_C$. The first filter part 162 and the second filter part 164 are, for example, low-pass filters that pass signal components having a frequency equal to or less than vc. In this case, the first filter part 162 supplies the first beat signal obtained by reducing the signal components having a frequency higher than the frequency vc to the first AD converter 202. Also, the second filter part 164 supplies the second beat signal obtained by reducing the signal components having a frequency higher than the frequency $v_C$ to the second AD converter 204.

The first AD converter 202 and the second AD converter 204 convert analog signals into digital signals. For example, the first AD converter 202 converts the first beat signal into a digital signal, and the second AD converter 204 converts the second beat signal into a digital signal. The first clock signal supplying part 210 supplies first clock signals to the first AD converter 202 and the second AD converter 204. By doing this, the first AD converter 202 and the second AD converter 204 convert the analog signals into the digital signals at approximately the same first sampling rate as a clock frequency of the received first clock signal.

Here, when the observation band is from 0 to $v_C$, the frequency of the beat signals is at most the cavity frequency $v_C$ of the optical cavity. Therefore, the first clock signal supplying part 210 supplies first clock signals having a frequency greater than or equal to twice the cavity frequency $v_C$ of the optical cavity to the first AD converter 202 and the second AD converter 204, whereby the beat signals can be observed.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. As described above, the conversion part 160 converts the beat signals into the digital signals at the first sampling rate, and then performs the frequency analysis on the digital signals. It should be noted that after the beat signals are converted into the digital signals, the conversion part 160 may configure a frequency analyzing part 220 using an integrated circuit or the like. The quadrature detection in the beat signal generation part 150 and the frequency analysis in the conversion part 160 will be described below.

Figure 6:
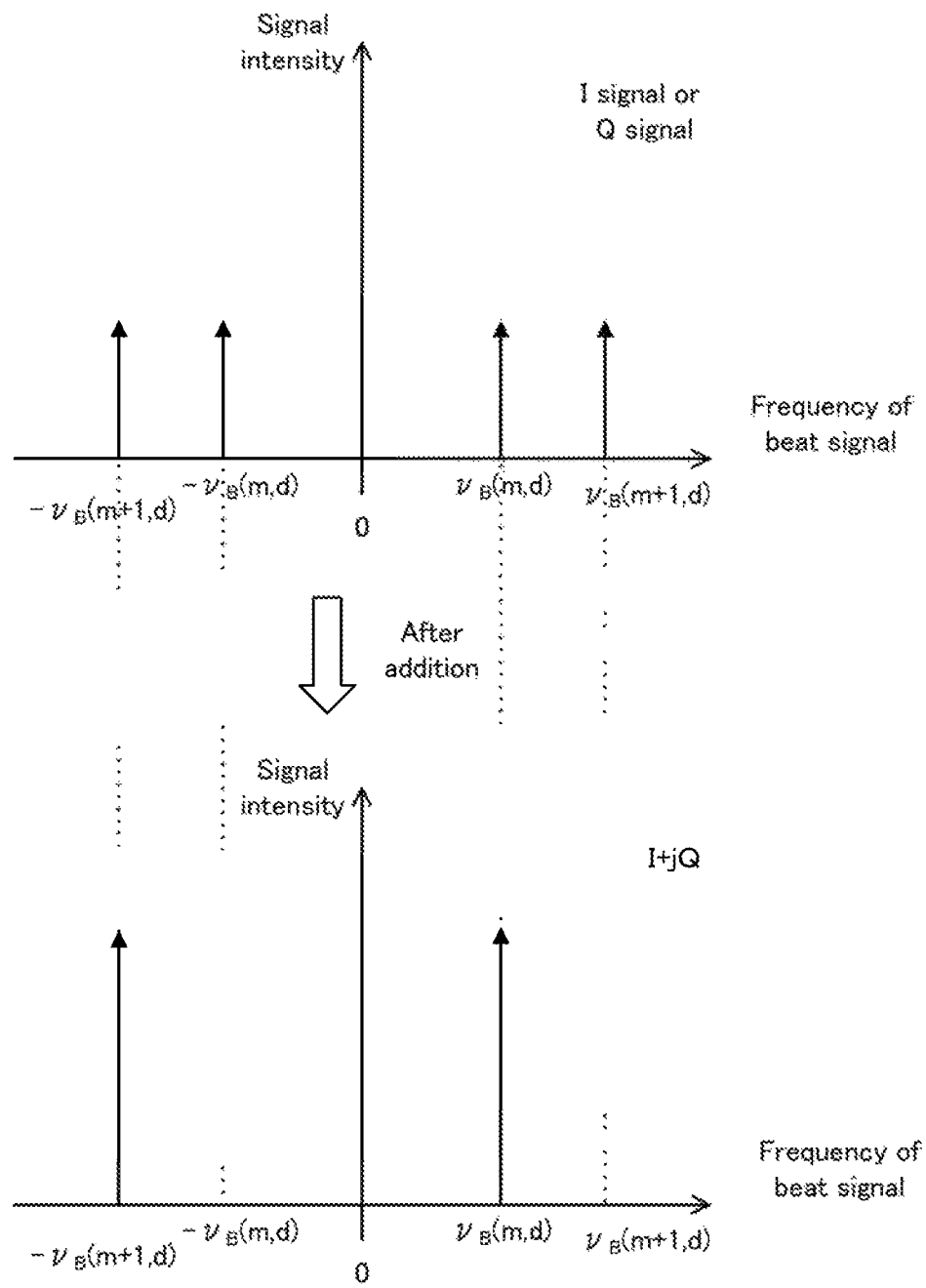
FIG. 6 shows an example of an outline of a quadrature detection by the beat signal generation part 150 and the conversion part 160 according to the present embodiment.

FIG. 6 shows an example of an outline of quadrature detection by the beat signal generation part 150 and the conversion part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the Q signal, for example, a beat signal $v_B(m, d)$ and an image signal $v_B(m+1, d)$ are observed in a frequency band between the frequencies 0 and $v_C$. In this case, in the I and Q signals, a beat signal $-v_B(m, d)$ and an original beat signal $-v_B(m+1, d)$ of the image signal exist in a frequency band between the frequencies 0 and $-v_C$ on the negative side.

Here, since the I signal and the Q signal are signal components being quadrature-detected by the beat signal generation part 150, they include different phase information even if the spectral shapes are the same. For example, in the frequency band between the frequencies 0 and $v_C$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_C$ on the negative side, phases of the beat signal $-v_B(m, d)$ of the I signal and the beat signal $-v_B(m, d)$ of the Q signal are mutually inverted.

Therefore, as shown in the lower part of FIG. 6, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_C$. Similarly, in the frequency band between the frequencies 0 and $-v_C$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_C$. Since the measurement apparatus 100 can cancel out the image signal in this manner, the frequency $v_B(m, d)$ of the beat signal can be detected. For example, the frequency analyzing part 220 outputs, as the frequency $v_B(m, d)$ of the beat signal, a frequency at which the signal intensity of the converted frequency signal is highest.

Here, the distance d measured by the measurement apparatus 100 is expressed by Equation 6. From Equation 6, it can be seen that the distance d can be calculated by using three frequencies $v_C$, $v_s$, and $v_B(m, d)$. Among the three frequencies, $v_B(m, d)$ can be detected as described above. Also, since $v_C$ and vs are the frequencies determined based on components used in the laser apparatus 110, $v_C$ and $v_s$ should ideally be fixed values. Here, since $v_s$ is the amount of frequency shift by the frequency shifter 112, $v_s$ can substantially be regarded as the fixed value by using a device with a stable shift amount as the frequency shifter 112.

On the other hand, since $v_C$ corresponds to an optical length of the cavity of the laser apparatus 110, it may change due to environmental fluctuations such as temperature. For example, if the laser apparatus 110 is the fiber ring laser, as described in FIG. 2, and the cavity is formed by optical fibers, the cavity length may change by approximately 10 ppm when an ambient temperature changes by one degree Celsius. It should be noted that even if the laser apparatus 110 is a solid-state laser such as a semiconductor laser or the like, the cavity length may be changed by such environmental fluctuations. Therefore, the extraction part 170 extracts the cavity frequency corresponding to the cavity length in order to monitor such a change in the cavity length. The extraction part 170 will be described below.

Figure 7:
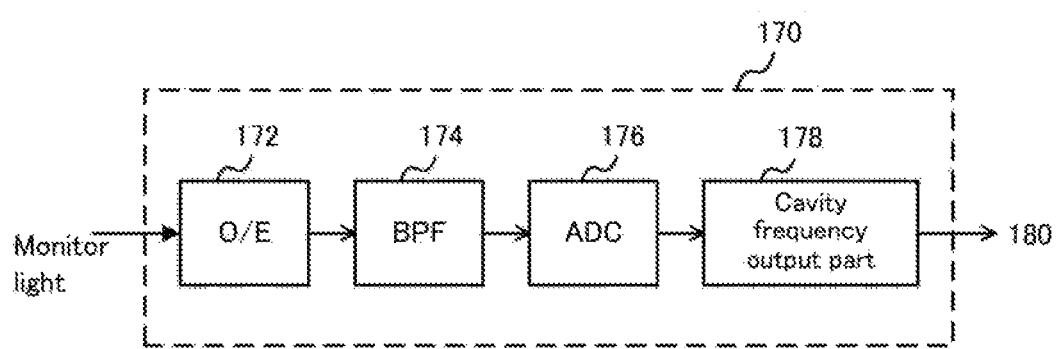
FIG. 7 shows a configuration example of an extraction part 170 according to the present embodiment.

FIG. 7 shows a configuration example of the extraction pan 170 according to the present embodiment. The extraction part 170 includes a photoelectric conversion part and extracts the signal component corresponding to the cavity frequency of the optical cavity from electrical signals converted by the photoelectric conversion part. The extraction part 170 includes a third photoelectric conversion part 172, a third filter part 174, a third AD converter 176, and a cavity frequency output pan 178.

The third photoelectric conversion part 172 converts the monitor light into an electrical signal. The third photoelectric conversion part 172 may be a photodiode or the like. As described in FIG. 4, the laser apparatus 110 outputs the frequency modulated laser beam having the plurality of longitudinal modes arranged at frequency intervals which approximately match the cavity frequency $v_C$. Therefore, when the third photoelectric conversion part 172 performs a photoelectrical conversion on the frequency-modulated laser beam, an electrical signal including the cavity frequency $v_C$ is outputted.

The third filter part 174 passes, within the electrical signal converted by the third photoelectric conversion part 172, a signal component having the cavity frequency $v_C$ of the optical cavity. The third filter part 174 has, for example, at least one of a high-pass filter, a low-pass filter, a band-pass filter, and a band-rejection filter. FIG. 7 shows an example in which the third filter part 174 is the band-pass filter.

The third AD converter 176 converts inputted analog signals into digital signals. The third AD converter 176 converts analog signals into digital signals in synchronization with a clock signal having a frequency greater than or equal to twice the resonant frequency $v_C$. The third AD converter 176, for example, operates when receiving the clock signal from the first clock signal supplying part 210.

The cavity frequency output part 178 performs the frequency analysis on the signal components that have passed through the third filter part 174. The cavity frequency output part 178 first converts the digital signal output from the third AD converter 176 into frequency data. As an example, the cavity frequency output part 178 performs a digital Fourier transform (DFT) on the digital signal. The cavity frequency output part 178 frequency-analyzes the frequency data and outputs a cavity frequency $v_C$. For example, the cavity frequency output part 178 outputs, as the cavity frequency $v_C$, a frequency at which the signal intensity of the frequency data is the largest.

As described above, the extraction part 170 shown in FIG. 7 extracts the signal component of the cavity frequency $v_C$ from the monitor light and outputs the signal component of the cavity frequency $v_C$. Therefore, even if the cavity length of the laser apparatus 110 changes due to a fluctuation in the ambient temperature, the extraction part 170 can extract and output the signal component of the cavity frequency $v_C$ which corresponds to the change. Since the calculation part 180 uses the fixed value $v_s$, $v_B(m, d)$ detected in the above-described manner, and the cavity frequency $v_C$, it is possible to calculate a distance d corresponding to the fluctuation in the ambient temperature.

As described above, even if the environmental fluctuations occur, the measurement apparatus 100 can suppress the reduction of measurement accuracy, since the measurement apparatus 100 monitors the cavity frequency $v_C$ corresponding to the environmental fluctuations and reflects the cavity frequency $v_C$ in the calculation of the distance d. Alternatively or additionally, the laser apparatus 110 may be placed in a temperature-stabilized controlled chamber, such as a thermostatic chamber, to reduce influence of environmental fluctuations and to suppress the reduction of measurement accuracy of the measurement apparatus 100.

However, since the above-mentioned measurement apparatus 100 tends to be a large-scale apparatus, problems such as increases in cost, increased effort needed for circuit adjustment or the like, and increased installation area or the like may occur. Therefore, the measurement apparatus according to the present embodiment enables suppressing of the reduction in accuracy with a simple configuration even if such environmental fluctuations occur. Next, such a measurement apparatus will be described.

[Configuration Example of a Measurement Apparatus 300]

Figure 8:
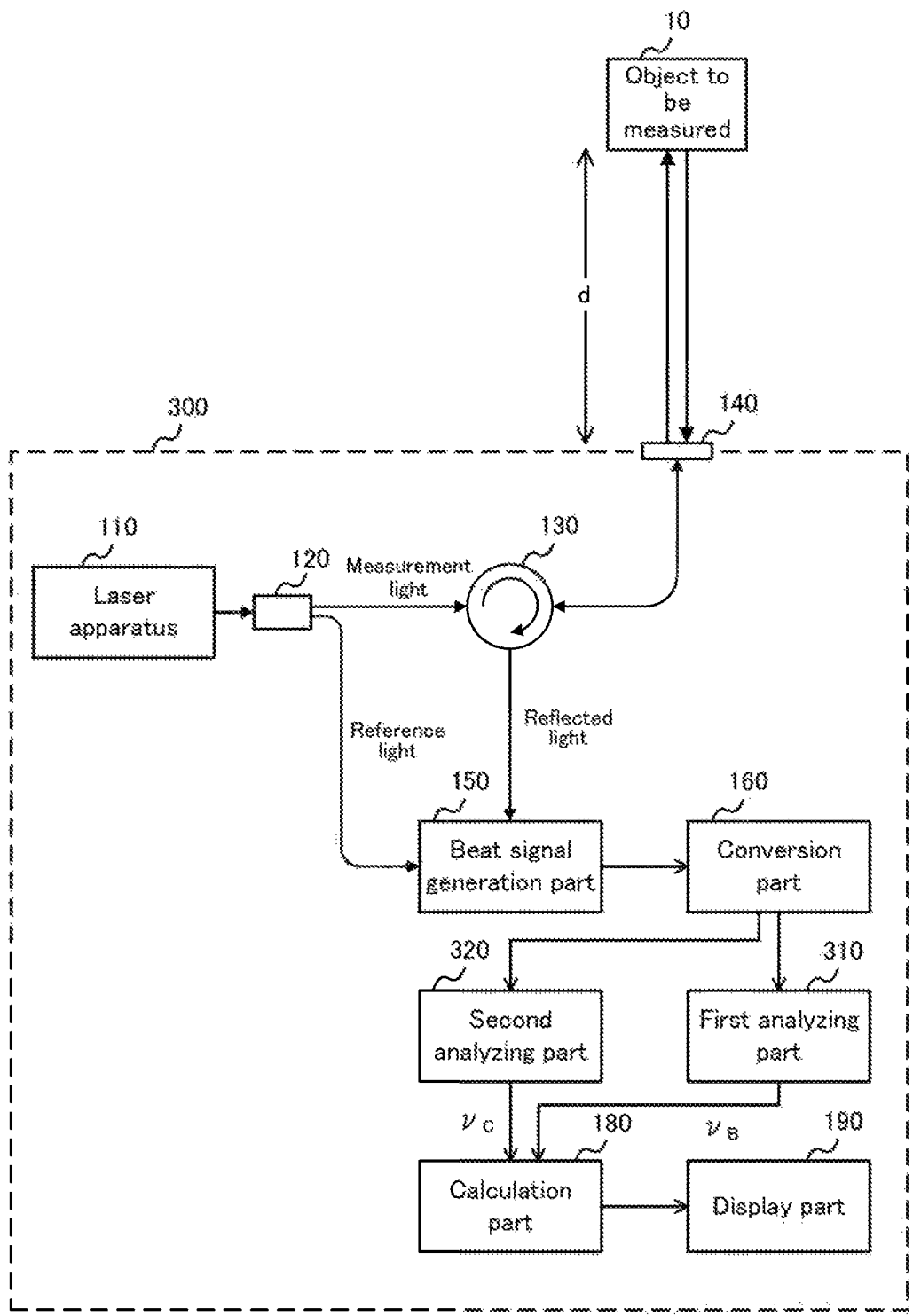
FIG. 8 shows a configuration example of a measurement apparatus 300 according to the present embodiment together with the object to be measured 10.

FIG. 8 shows a configuration example of a measurement apparatus 300 according to the present embodiment together with the object to be measured 10. In the measurement apparatus 300 shown in FIG. 8, operations approximately the same as those of the measurement apparatus 100 according to the present embodiment shown in FIG. 1 are denoted by the same reference numerals, and descriptions thereof are omitted. The measurement apparatus 300 further includes a first analyzing part 310 and a second analyzing part 320.

The branching part 120 branches the frequency-modulated laser beam output from the laser apparatus 110 into the reference light and the measurement light. The branching part 120 is, for example, a one-in-two-out fiber optic coupler. In an example of FIG. 8, the branching part 120 supplies the measurement light to the optical circulator 130 and the reference light to the beat signal generation part 150. The beat signal generation part 150 generates a beat signal on the basis of the measurement light and the reference light. The conversion part 160 converts the beat signal generated by the beat signal generation part 150 into a digital signal.

The first analyzing part 310 performs a frequency analysis on the digital signal converted by the conversion part 160. The first analyzing part 310 detects and outputs a frequency $v_B$ of the beat signal, using the frequency analysis.

The second analyzing part 320 performs the frequency-analysis on some of the digital signals converted by the conversion part 160. The second analyzing part 320 detects and outputs the cavity frequency $v_C$ of the laser cavity, using the frequency analysis.

The calculation part 180 calculates the difference in the propagation distance between the reference light and the measurement light based on the analysis results of the first analyzing part 310 and the second analyzing part 320. For example, the calculation part 180 calculates the distance d from the optical head part 140 to the object to be measured 10 on the basis of the frequency $v_B$ of the beat signal and the cavity frequency $v_C$.

The above-mentioned measurement apparatus 300 according to the present embodiment detects the cavity frequency $v_C$ by performing the frequency analysis on the beat signal generated by the beat signal generation part 150 without using the extraction part 170 described in FIG. 1 and FIG. 7. Next, the beat signal generated by the beat signal generation part 150 will be described.

Figure 9:
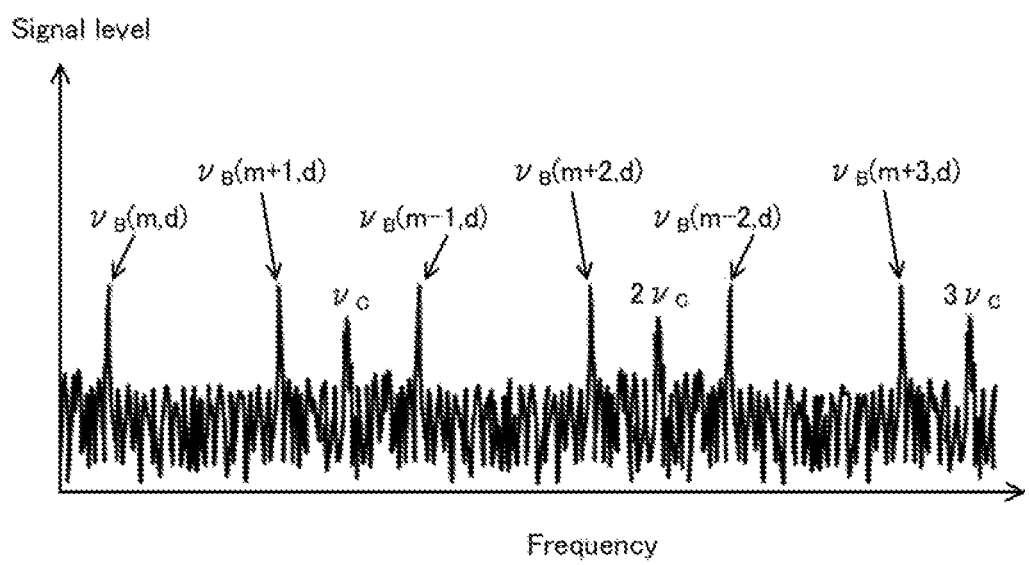
FIG. 9 shows an example of a beat signal generated by a beat signal generation part 150 according to the present embodiment.

FIG. 9 shows an example of the beat signal generated by the beat signal generation part 150 according to the present embodiment. The horizontal axis of FIG. 9 indicates the frequency and the vertical axis indicates the signal level. The beat signal shown in FIG. 9 shows an example of a signal waveform by which an image signal is generated, such as the I signal or the Q signal output by the beat signal generation part 150. For example, as described in FIG. 4, the beat signals $v_B(m, d)$, $v_B(m-1, d)$, $v_B(m-2, d)$, and so forth and the folded image signals $v_B(m+1, d)$, $v_B(m+2, d)$, $v_B(m+3, d)$, and so forth are observed.

Figure 10:
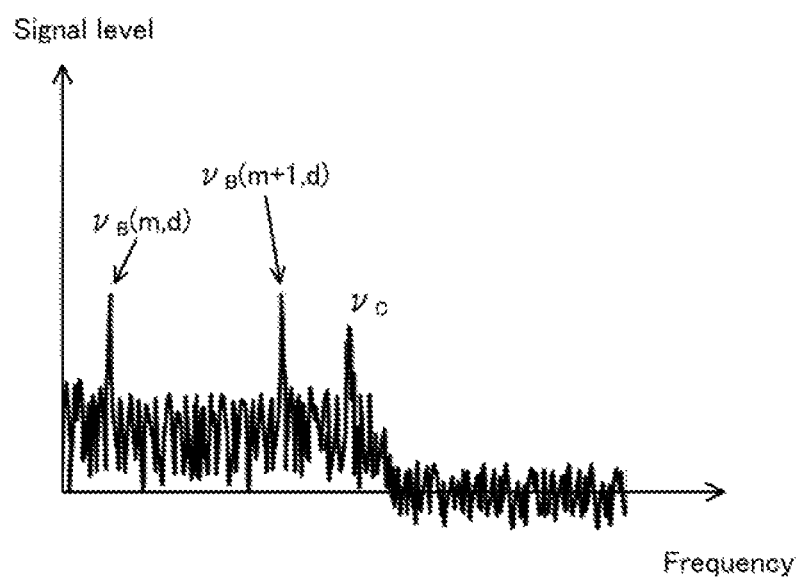
FIG. 10 shows an example of a result of filtering the beat signal generated by the beat signal generation part 150 according to the present embodiment.

FIG. 10 shows an example of a result of filtering the beat signal generated by the beat signal generation part 150 according to the present embodiment. The horizontal axis of FIG. 10 indicates the frequency and the vertical axis indicates the signal level. The beat signal shown in FIG. 10 shows an example of the beat signal in which signal components exceeding the frequency $v_C$ are reduced by passing signal components in the frequency band between the frequencies 0 and $v_C$ through the first filter part 162 or the second filter part 164.

In this case, as described in FIG. 6, the beat signals $v_B(m, d)$ and the image signals $v_B(m+1, d)$ are observed in the frequency band between the frequencies 0 and the $v_C$, for example. Here, since the image signals $v_B(m+1, d)$ are the signal components folded at the frequency $v_C$, the sum of the frequency of the beat signals $v_B(m, d)$ and the frequency of the image signals $v_B(m+1, d)$ is $v_C$. This is the same even if the observation band is a frequency band between the frequencies $(k-1) \cdot v_C$ and $k \cdot v_C$, where the sum of the frequency of the beat signals $v_B(m, d)$ and the frequency of the image signals $v_B(m+1, d)$ is $k \cdot v_C$. Here, k is an integer of 1 or more.

As described above, since the sum of a beat signal and an image signal adjacent to each other is a constant multiple of the frequency $v_C$, the measurement apparatus 300 can obtain the cavity frequency $v_C$ from the beat signal without extracting the cavity frequency $v_C$ from the monitor light using the extraction part 170. Next, the beat signal generation part 150, the conversion part 160, the first analyzing part 310, and the second analyzing part 320 of such a measurement apparatus 300 will be described.

Figure 11:
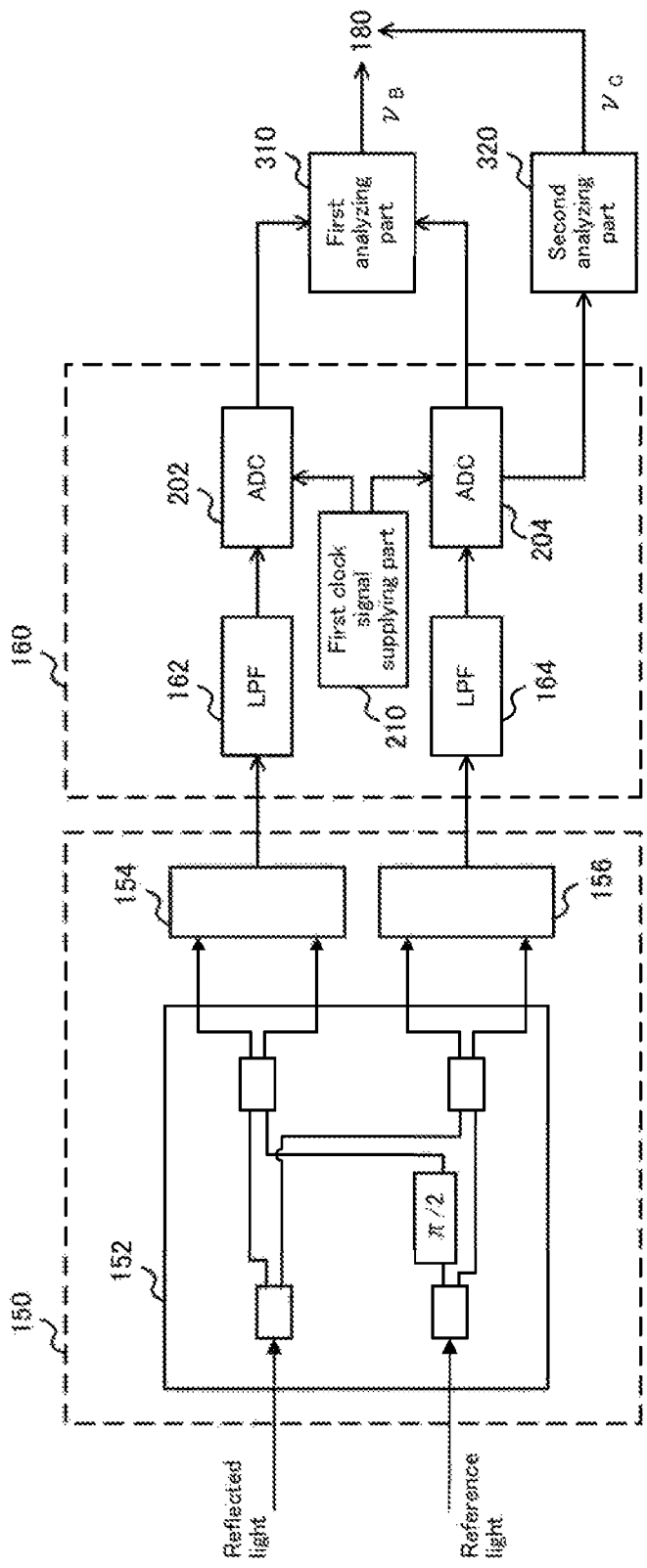
FIG. 11 shows a configuration example of the beat signal generation part 150, the conversion part 160, a first analyzing part 310, and a second analyzing part 320 according to the present embodiment.

FIG. 11 shows a configuration example of the beat signal generation part 150, the conversion part 160, the first analyzing part 310, and the second analyzing part 320 according to the present embodiment. In the beat signal generation part 150 and the conversion part 160 shown in FIG. 11, operations approximately the same as those of the beat signal generation part 150 and the conversion part 160 according to the present embodiment shown in FIG. 5 are denoted by the same reference numerals, and descriptions thereof are omitted.

The beat signal generation part 150 quadrature-detects the reflected light and the reference light and outputs the first beat signal and the second beat signal that are orthogonal to each other. The conversion part 160 has the first filter part 162, the second filter par 164, the first AD converter 202, the second AD converter 204, and the first clock signal supplying part 210, and converts the first beat signal and the second beat signal into digital signals. Operations of the above-mentioned beat signal generation part 150 and the conversion part 160 are the same as the operations described in FIG. 5 and the like.

The first analyzing part 310 analyzes a first signal component corresponding to the difference in the propagation distance between the reference light and the measurement light on the basis of the beat signal. The first analyzing part 310 generates the first signal component consisting of (i) a real part generated by performing a frequency conversion on a digital signal output by the first AD converter 202 and (ii) an imaginary part generated by performing a frequency conversion on a digital signal output by the second AD converter 204. In this manner, the first analyzing part 310 detects the frequency $\nu_B$ of the beat signal by performing the frequency analysis on the first signal component based on the first beat signal and the second beat signal. That is, operations of the first analyzing part 310 are the same as the operations of the frequency analyzing part 220 described in FIG. 5 or the like, and its detailed description is omitted here.

The second analyzing part 320 analyzes a second signal component corresponding to the cavity frequency of the laser cavity on the basis of the beat signal. The second signal component, on which the second analyzing part 320 performs the frequency analysis, is a signal component based on one of the first beat signal or the second beat signal. For example, the second analyzing part 320 generates the second signal component by performing the frequency conversion on the digital signal output by the first AD converter 202 or the second AD converter 204.

FIG. 11 shows an example where the second analyzing part 320 generates the second signal component by performing the frequency conversion on the digital signal output by the second AD converter 204. The second analyzing part 320 analyzes the second signal component, obtains a frequency of the beat signal $\nu_B(m, d)$ and a frequency of the image signal $\nu_B(m+1, d)$, and adds the two obtained frequencies together to calculate the cavity frequency $\nu_C$ of the laser cavity.

As described above, the first analyzing part 310 detects the frequency $\nu_B$ of the beat signal, and the second analyzing part 320 detects the cavity frequency $\nu_C$ of the optical cavity. Therefore, the calculation part 180 can calculate the difference in the propagation distance between the reference light and the measurement light based on the analysis results of the rust signal component and the second signal component.

As described above, even if the cavity length of the laser apparatus 110 changes due to environmental fluctuations or the like, the measurement apparatus 300 according to the present embodiment detects the beat signal $\nu_B(m, d)$ and the cavity frequency $\nu_C$ corresponding to the fluctuations. Accordingly, since the calculation part 180 uses the fixed value $\nu_s$, the beat signal $\nu_B(m, d)$ detected in the above-described manner, and the cavity frequency $\nu_C$, it is possible to calculate the distance d between the optical head part 140 and the object to be measured 10 corresponding to the fluctuation in the ambient temperature.

Also, since the measurement apparatus 300 detects the cavity frequency $\nu_C$ on the basis of the beat signal output by the beat signal generation part 150, the extraction part 170 or the like for monitoring the cavity frequency $\nu_C$ is not necessary. Therefore, the measurement apparatus 300 can suppress the reduction in accuracy with a simple configuration, without increasing the scale of apparatus.

The example where the second analyzing part 320 according to the present embodiment calculates the cavity frequency $\nu_C$ by adding together the frequencies of the beat signal $\nu_B(m, d)$ and the image signal $\nu_B(m+1, d)$ has been described, but the invention is not limited to this. The second analyzing part 320 may directly detect the cavity frequency $\nu_C$, for example. As shown in FIG. 9 and FIG. 10, the signal component corresponding to the laser cavity frequency $\nu_C$ is superimposed on the beat signal generated by the beat signal generation part 150.

This is a result of an imbalance in the intensity levels of optical signals input respectively to the first photoelectric conversion part 154 and the second photoelectric conversion part 156, caused by a mismatch or the like in the optical 90-degree hybrid 152 of the beat signal generation part 150. Even if such a mismatch occurs, if the S/N of the beat signal detection by the measurement apparatus 300 does not-decrease, the second analyzing part 320 may directly obtain the cavity frequency $\nu_C$ by analyzing the beat signals generated by the beat signal generation part 150. In this case, since the calculation par 180 can use the fixed value $\nu_s$, the detected $\nu_B(m, d)$, and the cavity frequency $\nu_C$, the distance d corresponding to the fluctuation in the ambient temperature can be calculated.

The example where the measurement apparatus 300 according to the present embodiment detects the cavity frequency $\nu_C$, in addition to measuring the beat signal $\nu_B(m, d)$, and calculates the distance d between the optical head part 140 and the object to be measured 10 has been described. When an observation result of the change in the cavity length is used for the distance measurement in this manner, observation variation in the cavity length is superimposed on variation in the distance measurement, which causes an increase of variation in the distance measurement. Here, supposing that the variation in the distance measurement is $\Delta d$, variation in a measurement of the beat signal is $\Delta \nu_B$, and variation in a measurement of the cavity frequency is $\Delta \nu_C$, the variation in the distance measurement $\Delta d$ is expressed by the following equation.

$$(\Delta d)^2 = \left(\frac{\partial d}{\partial \nu_B}\right)^2 \cdot (\Delta \nu_B)^2 + \left(\frac{\partial d}{\partial \nu_C}\right)^2 \cdot (\Delta \nu_C)^2 \qquad \text{[Equation 7]}$$

As shown in Equation 7, by using the measurement result of the cavity frequency, it can be understood that the variation in the distance measurement $\Delta d$ increases by a term including the measurement variation $\Delta \nu_C$ of the cavity frequency. Therefore, the measurement apparatus 300 according to the present embodiment may reduce the measurement variation $\Delta \nu_C$ of the cavity frequency to enable the measurement of a distance with high accuracy.

For example, the timing at which the second analyzing part 320 detects the cavity frequency $\nu_C$ may be set to be later than the timing at which the beat signal $\nu_B(m, d)$ of the first analyzing part 310 is measured. In this case, for example, a clock frequency to be synchronized for an operation of the second analyzing part 320 may be slower than a clock frequency to be synchronized for an operation of the first analyzing part 310. Further, an output signal of the second analyzing part 320 may be filtered. Next, such a measurement apparatus 300 will be described.

Figure 12:
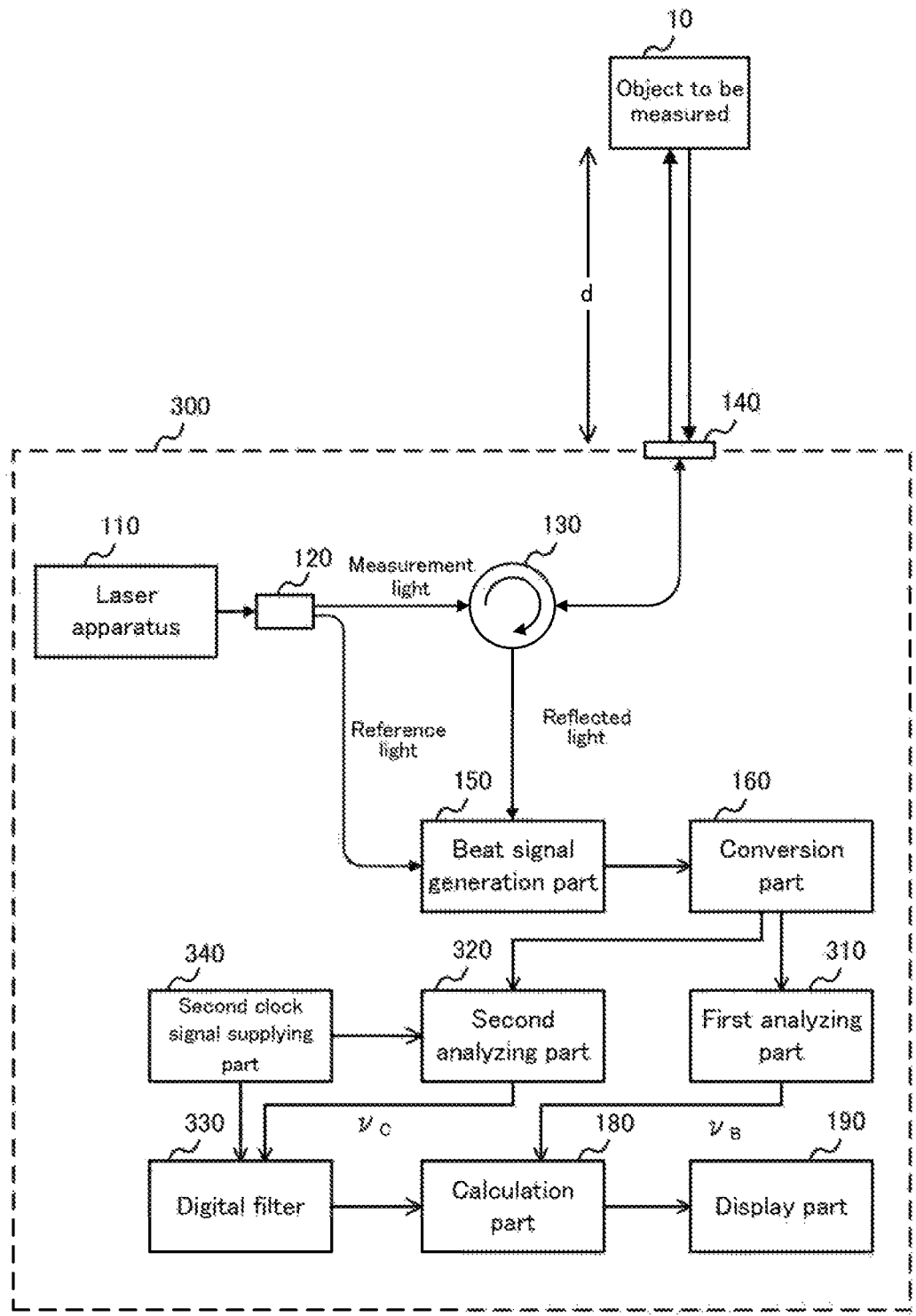
FIG. 12 shows a variation example of the measurement apparatus 300 according to the present embodiment together with the object to be measured 10.

FIG. 12 shows a variation example of the measurement apparatus 300 according to the present embodiment together with the object to be measured 10. In the measurement apparatus 300 shown in FIG. 12, the operations substantially the same as those of measurement apparatus 300 according to the present embodiment shown in FIG. 8 are denoted by the same reference numerals, and descriptions thereof are omitted. The measurement apparatus 300 of the variation example further includes a digital filter 330 and a second clock signal supplying part 340.

The digital filter 330 digitally filters the analysis result of the second analyzing part 320. The digital filter 330 filters the signal component corresponding to the cavity frequency $v_C$ output by the second analyzing part 320 and reduces the measurement variation $\Delta v_C$ of the cavity frequency $v_C$. The digital filter 330 is, for example, a Kalman filter, a Gaussian filter, a moving average filter, or the like. The digital filter 330 may further include a thinning filter, a high-pass filter, a low-pass filter, a band-pass filter, and/or a band-rejection filter or the like.

The second clock signal supplying part 340 supplies second clock signals to the digital filter 330. Further, the second clock signal supplying part 340 may supply the second clock signals to the second analyzing part 320. Furthermore, the first clock signal supplying part 210 may supply the first clock signals to the first analyzing part 310.

Since the detection of the cavity frequency $v_C$ by the second analyzing part 320 and a filtering process performed by the digital filter 330 are for measuring the fluctuation of the cavity frequency $v_C$ caused by the environmental temperature or the like, the clock frequency used for these processing operations may be a relatively low. For example, the second clock signals used by the second analyzing part 320 and the digital filter 330 may have a clock frequency lower than the clock frequency of the first clock signal which is used to measure the beat signal for measuring the difference in the propagation distance between the reference light and the measurement light.

Therefore, the second clock signal supplying part 340 supplies the second clock signal having a lower clock frequency than the first clock signal to the digital filter 330. By doing this, the digital filter 330 performs a digital filtering at a sampling rate that is slower than the sampling rate at which the first AD converter 202 and the second AD converter 204 convert the input signals into the digital signals.

Therefore, for example, even if the measurement variation $\Delta v_C$ of the cavity frequency $v_C$ is superimposed on the cavity frequency $v_C$ output by the second analyzing part 320, the digital filter 330 outputs the cavity frequency $v_C$ having the reduced measurement variation $\Delta v_C$. Such a filtering process of the digital filter 330 can be realized by a known algorithm or the like without providing a special device or the like. Therefore, the measurement apparatus 300 can measure the distance d to the object to be measured 10 with higher accuracy while suppressing an increase in cost.

A part of the measurement apparatus 300 according to the present embodiment is formed, for example, by an integrated circuit or the like. In this case, at least a part of the calculation part (circuitry) 180, the display part 190, the frequency analyzing part 220, the first analyzing part 310, the second analyzing part 320, and the digital filter 330 includes, for example, a field programmable gate array (FPGA), a digital signal processor (DSP), and/or a central processing unit (CPU). Also, the measurement apparatus 300 may include a storage unit.

The storage unit may store an operating system (OS) and various pieces of information such as programs that execute a computer or the like when the computer or the like functions as a part of the calculation part 180, the display part 190, the frequency analyzing part 220, the first analyzing part 310, the second analyzing part 320, and the digital filter 330. Also, the storage unit may store various pieces of information including a database to be referred to at the time of executing the programs. For example, the computer functions at least as a part of the calculation part 180, the display part 190, the frequency analyzing part 220, the first analyzing part 310, the second analyzing part 320, and the digital filter 330 by executing the programs stored in the storage unit.

The storage unit includes, for example, a read only memory (ROM) storing a basic input output system (BIOS) or the like of a computer or the like, and a random access memory (RAM) serving as a work area. Also, the storage unit may include a large-capacity storage device like a hard disk drive (HDD) and/or a solid state drive (SSD). Also, the computer may further include a graphics processing unit (GPU) or the like.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments. Further, effects of the new embodiment brought by the combinations also have the effect of the original exemplary embodiment together.

What is claimed is:
1. A measurement apparatus comprising:
a laser apparatus that has an optical cavity and outputs a frequency-modulated laser beam with a plurality of modes;
a branch that branches a first portion of the frequency-modulated laser beam output by the laser apparatus as a reference light and at least some of a remaining second portion of the frequency-modulated laser beam as a measurement light;
a beat signal generator that generates a beat signal by mixing the reference light and a reflected light that is reflected by radiating the measurement light onto an object;
first analyzer circuitry configured to analyze a first signal component corresponding to a difference in a propagation distance between the reference light and the measurement light on the basis of the beat signal;
second analyzer circuitry configured to analyze a second signal component corresponding to a cavity frequency of the optical cavity on the basis of the beat signal; and
calculation circuitry configured to calculate the difference in the propagation distance between the reference light and the measurement light based on analysis results of the first signal component and the second signal component.
2. The measurement apparatus according to claim 1, wherein the beat signal generator quadrature-detects the reflected light and the reference light and outputs a first beat signal and a second beat signal that are orthogonal to each other, the first analyzer circuitry performs a frequency analysis on the first signal component based on the first beat signal and the second beat signal, and the second analyzer circuitry performs the frequency analysis on the second signal component based on one of the first beat signal and the second beat signal.

3. The measurement apparatus according to claim 2, wherein the second analyzer circuitry performs the frequency analysis on the second signal component and calculates the cavity frequency of the optical cavity.

4. The measurement apparatus according to claim 3, wherein the second analyzer circuitry obtains frequencies of the beat signal and an image signal that are adjacent to each other, among beat signals and image signals contained in the second signal component, and calculates the cavity frequency of the optical cavity by adding together the two obtained frequencies.

5. The measurement apparatus according to claim 3, wherein the second analyzer circuitry obtains the cavity frequency of the optical cavity by frequency-analyzing a signal component, corresponding to the cavity frequency of the optical cavity, from within the second signal component.

6. The measurement apparatus according to claim 2, further comprising a first AD converter that converts the first beat signal into a first digital signal; and a second AD converter that converts the second beat signal into a second digital signal, wherein the first analyzer circuitry generates the first signal component consisting of (i) a real part generated by performing a frequency conversion on the first digital signal output by the first AD converter and (ii) an imaginary part generated by performing a frequency conversion on the second digital signal output by the second AD converter, and the second analyzer circuitry generates the second signal component by performing the frequency conversion on the first digital signal output by the first AD converter or the second digital signal output by the second AD converter.

7. The measurement apparatus according to claim 6, further comprising a digital filter that digitally filters an analysis result of the second analyzer circuitry.

8. The measurement apparatus according to claim 7, wherein the digital filter performs digital filtering at a sampling rate that is slower than a sampling rate at which the first AD converter and the second AD converter convert input signals into the first and second digital signals.

9. A measurement method comprising:

outputting a frequency-modulated laser beam with a plurality of modes from a laser apparatus having an optical cavity;

branching a first portion of the frequency-modulated laser beam as a reference light and at least some of a remaining second portion as a measurement light;

generating a beat signal by mixing the reference light and a reflected light that is reflected by radiating the measurement light onto an object to be measured;

analyzing a first signal component corresponding to a difference in a propagation distance between the reference light and the measurement light on the basis of the beat signal;

analyzing a second signal component corresponding to a cavity frequency of the optical cavity on the basis of the beat signal; and calculating the difference in the propagation distance between the reference light and the measurement light based on analysis results of the first signal component and the second signal component.

10. The measurement method according to claim 9, further comprising:

quadrature-detecting the reflected light and the reference light and outputting a first beat signal and a second beat signal that are orthogonal to each other;

performing a frequency analysis on the first signal component based on the first beat signal and the second beat signal, and performing the frequency analysis on the second signal component based on one of the first beat signal and the second beat signal.

11. The measurement method according to claim 10, further comprising performing the frequency analysis on the second signal component and calculates the cavity frequency of the optical cavity.

12. The measurement method according to claim 11, wherein the performing the frequency analysis includes obtaining frequencies of the beat signal and an image signal that are adjacent to each other, among beat signals and image signals contained in the second signal component, and calculating the cavity frequency of the optical cavity by adding together the two obtained frequencies.

13. The measurement method according to claim 11, wherein the performing the frequency analysis includes obtaining the cavity frequency of the optical cavity by frequency-analyzing a signal component, corresponding to the cavity frequency of the optical cavity, from within the second signal component.

14. The measurement method according to claim 10, further comprising:

converting the first beat signal into a first digital signal;

converting the second beat signal into a second digital signal;

generating the first signal component consisting of (i) a real part generated by performing a frequency conversion on the first digital signal and (ii) an imaginary part generated by performing a frequency conversion on the second digital signal; and generating the second signal component by performing the frequency conversion on the first digital signal or the second digital signal.

15. The measurement apparatus according to claim 14, further comprising digitally filtering an analysis result of the analyzing of the second signal component corresponding to the cavity frequency of the optical cavity on the basis of the beat signal.

16. The measurement apparatus according to claim 15, wherein the digitally filtering includes performing digital filtering at a sampling rate that is slower than a sampling rate at which input signals are converted into the first and second digital signals.

* * * * *